United States Patent
Chatterjee et al.

(10) Patent No.: US 8,983,390 B2
(45) Date of Patent: Mar. 17, 2015

(54) POWER CONSCIOUS SELF-HEALING TRANSCEIVER SYSTEMS AND METHODS

(75) Inventors: Abhijit Chatterjee, Marietta, GA (US); Shreyas Sen, Atlanta, GA (US); Shyam Kumar Devarakond, Atlanta, GA (US); Vishwanath Natarajan, Chandler, AZ (US)

(73) Assignee: Georgia Tech Research Corporation, Atlanta, GA (US)

( * ) Notice: Subject to any disclaimer, the term of this patent is extended or adjusted under 35 U.S.C. 154(b) by 878 days.

(21) Appl. No.: 13/109,506

(22) Filed: May 17, 2011

(65) Prior Publication Data

US 2012/0128041 A1 May 24, 2012

Related U.S. Application Data

(60) Provisional application No. 61/345,311, filed on May 17, 2010.

(51) Int. Cl.
*H04B 17/00* (2006.01)
*H04B 1/40* (2006.01)
*H04B 1/00* (2006.01)

(52) U.S. Cl.
CPC .................................. *H04B 1/0003* (2013.01)
USPC ......................................... 455/67.11; 455/77

(58) Field of Classification Search
CPC ......... H04B 1/38; H04B 17/00; H04W 24/00; H04L 12/26; H04L 12/2634
USPC .............. 455/423, 66.1, 67.11, 77, 87, 550.1, 455/90.1
See application file for complete search history.

(56) References Cited

U.S. PATENT DOCUMENTS

| | | | |
|---|---|---|---|
| 8,193,975 B2 * | 6/2012 | Zheng | 342/354 |
| 2004/0127178 A1 * | 7/2004 | Kuffner | 455/133 |
| 2006/0046659 A1 * | 3/2006 | Haartsen et al. | 455/67.11 |
| 2007/0072555 A1 * | 3/2007 | Reese et al. | 455/67.14 |
| 2010/0067622 A1 * | 3/2010 | Komaili et al. | 375/345 |
| 2010/0076714 A1 * | 3/2010 | Discenzo | 702/104 |
| 2011/0124364 A1 * | 5/2011 | Donovan et al. | 455/522 |
| 2012/0058775 A1 * | 3/2012 | Dupray et al. | 455/456.1 |

* cited by examiner

*Primary Examiner* — Andrew Wendell
(74) *Attorney, Agent, or Firm* — Troutman Sanders LLP; Ryan A. Schneider; Dustin B. Weeks (57) ABSTRACT

The various embodiments of the present disclosure relate generally to power-conscious self-healing transceiver systems and methods. An embodiment of the present invention provides a method of power-consciously self-healing a transceiver system. The method comprises providing a transceiver device having a plurality of tuning elements configured to control a plurality of specifications of the device, determining initial values for the plurality of tuning elements, and performing a hardware-iterative gradient search to obtain values for each tuning element such that the plurality of specifications are within a tolerated range.

10 Claims, 9 Drawing Sheets

Figure 9

POWER CONSCIOUS SELF-HEALING TRANSCEIVER SYSTEMS AND METHODS

CROSS-REFERENCE TO RELATED APPLICATIONS

This application claims the benefit of U.S. Provisional Application Ser. No. 61/345,311, filed 17 May 2010, which is incorporated herein by reference in its entirety as if fully set forth below.

FEDERALLY SPONSORED RESEARCH STATEMENT

The invention described in this patent application was made with Government support under Agreement No. HR0011-10-3-0002, awarded by DARPA. The Government has certain rights in the invention described in this patent application.

TECHNICAL FIELD OF THE INVENTION

The various embodiments of the present disclosure relate generally transceiver systems. More particularly, the various embodiments of the present invention are directed to power conscious self-healing transceiver systems and methods.

BACKGROUND OF THE INVENTION

In today's world many Radio-Frequency ("RF") transceiver systems are integrated on a single chip—often denoted as SoCs, or Systems on a Chip. Each transceiver system may have several specifications, including, but not limited to, gain, I-Q mismatch, and phase noise, and the like. Each specification must be within a predetermined range, which may depend on a particular application, to ensure adequate performance of the system. During the manufacturing process, it is difficult to guarantee that the specifications of each chip will be within a predetermined range. As a consequence, any units failing to satisfy the specification requirements are usually cast away, thus increasing the overall manufacturing costs. Additionally, over time, the specifications of the chips may begin to fall outside of the predetermined specifications such that the integrated chips must be replaced.

Determining when these chips go bad and replacing the chips can serve to be very costly. Thus, some conventional transceiver systems provide methods of tuning the chips to restore a specification within the predetermined operational range. Unfortunately, however, these conventional transceiver systems focus only on tuning individual components and/or individual specifications of the systems. Conventional systems may also attempt to tune the chips such that the specifications have an optimal value, instead of simply having values within a operational range. Further, these conventional systems fail to consider the power implications associated with tuning the chips. Thus, a great amount of power may be associated with tuning the chips, such that the cost associated with tuning the chips exceeds the cost required to replace the chips.

Therefore, there is a desire for transceiver systems that capable of power-consciously self-tuning themselves such that the specifications of the transceiver systems stay within predetermined operational ranges. There is also a desire for methods of power-consciously self-healing a transceiver system such that the specifications of the system stay within predetermined operational ranges. Various embodiments of the present invention address these desires.

BRIEF SUMMARY OF THE INVENTION

The present invention relates to power-conscious self-healing transceiver systems and methods. An exemplary embodiment of the present invention provides a power-conscious self-healing transceiver system comprising a transceiver device, a plurality of tuning elements, a regression analysis module, a digital signal processing ("DSP") baseband module, and a gradient search module. The transceiver device has a plurality of specifications. The tuning elements are configured to control the plurality of specifications. The regression analysis module is configured to measure the plurality of specifications from a signal transmitted through the transceiver device. In some embodiments of the present invention, the regression analysis module employs architecture to implement the MARS algorithm. The DSP baseband module is configured to transmit the signal through the transceiver device and configured to compute a cost function based on the measured plurality of specifications. The gradient search module is configured to determine new iteration values for the plurality of tuning elements such that the plurality of specifications are within a tolerated range.

In some embodiments of the present invention, the transceiver device is a RF transceiver. In some embodiments of the present invention, the transceiver device comprises a transmitter, a receiver, and an envelope detector. The transmitter is configured to receive the signal from the DSP baseband module and up-convert the signal. The receiver is configured to receive the signal from the transmitter. The envelope detector is configured to receive the signal from the transmitter and down-convert the signal. The regression analysis module receives the signal from the envelope detector.

In yet another exemplary embodiment of the present invention, the gradient search module is configured to determine new iteration values for the plurality of tuning elements based on the measured plurality of specifications resulting from previous iteration values for the plurality of tuning elements. In still yet another exemplary embodiment of the present invention, the gradient search module is further configured to determine power-conscious initial iteration values for the plurality of tuning elements. In even another exemplary embodiment of the present invention, the power-conscious initial iteration values are determined from an initial guess function, wherein the initial guess function is derived from statistical analysis of a sample set of tuning element value variations.

Another exemplary embodiment of the present invention provides a method of power-consciously self-healing a transceiver system, comprising providing a transceiver device having a plurality of tuning elements configured to control a plurality of specifications of the transceiver device, determining initial values for the plurality of tuning elements, and performing a hardware-iterative gradient search to obtain values for each tuning element such that the plurality of specifications are within a tolerated range. In some embodiments of the present invention, the method further comprises the step of terminating the method if at least one of the plurality of specifications is outside of a predetermined self-healing range. In an exemplary embodiment of the method of power-consciously self-healing a transceiver system, the step of determining initial values for the plurality of tuning elements comprises evaluating a power-conscious initial guess function, wherein the power-conscious initial guess function is derived from statistical analysis of a sample set of tuning element value variations. In another exemplary embodiment of the method of power-consciously self-healing a transceiver system, the step of performing a hardware-iterative gradient search comprises at least one iteration of: performing a first derivative approximation of a cost function of the transceiver system to obtain a gradient value along the steepest direction for each tuning element; determining an optimum step size for each tuning element; and adjusting the value of each tuning element by the optimum step size.

Yet another exemplary embodiment of the present invention provides a method of power-consciously self-healing a transceiver system, the method comprising the following: providing a transceiver system having a transceiver device with a plurality of specifications, a plurality of tuning elements to control the plurality of specifications, a DSP baseband module, a gradient search module, and a regression analysis module; determining power-conscious initial values for the plurality of tuning elements with the gradient search module; transmitting a signal from the DSP baseband module; computing a cost function based on the measured plurality of specifications; and determining new values for each tuning element with the gradient search module such that the plurality of specifications are within a tolerated range. In an exemplary embodiment of the present invention, the step of determining initial values for the plurality of tuning elements comprises evaluating an initial guess function, wherein the initial guess function is derived from statistical analysis of a sample set of tuning element value variations.

These and other aspects of the present invention are described in the Detailed Description below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

DETAILED DESCRIPTION OF THE INVENTION

To facilitate an understanding of the principles and features of the present invention, various illustrative embodiments are explained below. In particular, the invention is described in the context of being power-conscious self-healing transceiver systems and methods. Embodiments of the present invention may be applied to systems or methods for power-consciously tuning a transceiver system. In some embodiments of the present invention, the transceiver system can be an RF transceiver system. As described herein, RF is not limited to any particular frequency band and includes, but is not limited to, the High Frequency ("HF") band, the Very High Frequency ("VHF") band, the Ultra High Frequency ("UHF") band, Long wave ("L") band, Short wave ("S") band, the C band, the X band, the Kurz-Under ("$K_u$") band, the Kurz ("K") band, the Kurz-Above ("$K_a$") band, the V band, the W band, the mm band, and the like.

The components described hereinafter as making up various elements of the invention are intended to be illustrative and not restrictive. Many suitable components or steps that would perform the same or similar functions as the components or steps described herein are intended to be embraced within the scope of the invention. Such other components or steps not described herein can include, but are not limited to, for example, similar components or steps that are developed after development of the invention.

Figure 8:
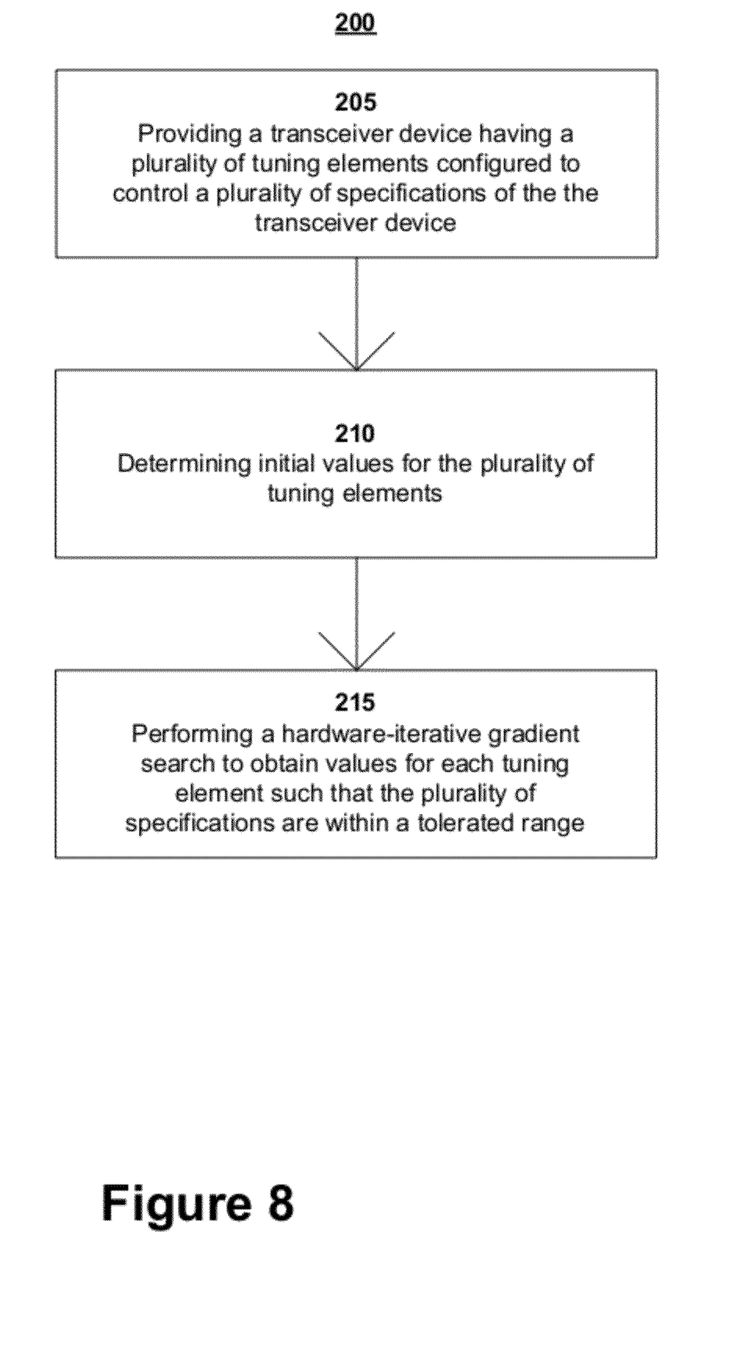
FIG. 8 provides a block diagram of a method of power-consciously self-healing a transceiver system, in accordance with an exemplary embodiment of the present invention.

As shown in FIG. 8, an exemplary embodiment of the present invention provides a method of power-consciously self-healing a transceiver system 200. The method 200 comprises providing a transceiver device having a plurality of tuning elements configured to control a plurality of specifications 205, determining initial values for the plurality of tuning elements 210, and performing a hardware-iterative gradient search to obtain values for each tuning element such that the plurality of specifications are within a tolerated range 215. In an exemplary embodiment of the present invention the transceiver system is a RF transceiver system. In some embodiments of the present invention the tuning elements are tuning knobs which may control the plurality of specifications by altering various capacitances, resistances, voltages and/or currents within the transceiver device. Thus, in some embodiments of the present invention, $K=[K_1, K_2, \ldots, K_N]$ can be a vector describing the values of N tuning elements.

In an exemplary embodiment of the present invention, the step of determining initial values for the plurality of tuning elements 210 involves making a power-conscious initial guess of the values of K. In some embodiments of the present invention, this initial guess generation involves one application of an Alternative Expanded ("AE") Built-In Self Test ("BIST") procedure to the transceiver system to determine multiple specifications of the transceiver system using a single test application. A hardware-iterative gradient search can then be performed to obtain new values for the plurality of tuning elements.

In an exemplary embodiment of the present invention, the step of performing a hardware-iterative gradient search 215 comprises at least one iteration of: performing a first derivative approximation of a cost function (Cost function f(K) defines the relationship between the plurality of transceiver specifications under consideration and the plurality of the tuning elements under considerations) of the transceiver system to obtain a gradient value along the steepest direction for each tuning element; determining an optimum step size for each tuning element; and adjusting the value of each tuning element by the optimum step size. In an exemplary embodiment, the step of performing a hardware-iterative gradient search 215 involves using a steepest descent gradient search algorithm to minimize the cost function (f(K)=cost function in Equations 1-3 for tuning element values given by the vector K) that represents the difference between the desired and observed performance specifications of the transceiver device. The evaluation of the cost function can involve using the AE-BIST procedure. A central difference based first derivative approximation of the cost function can be used to obtain the gradient value along the steepest direction for each tuning element as shown in Equation 1. This can involve perturbing each tuning element value by δ and running the AE-BIST procedure to determine the effect of the change in tuning element values on the specifications of the transceiver device (hence the term hardware-iterated). The gradient vector for each tuning element in the system (as shown in Equation 2) can then be used to obtain the steepest descent direction $S_k$, as shown in Equation 3. The optimum step size (Equation 4, $h_{opt}$) for each iteration can then be computed using 'golden ratio' based line-search for faster convergence. The tuning element vector K can then be updated as per Equation 5.

$$\frac{\Delta f}{\Delta K_i} = \frac{f(K_i + \delta) - f(K_i - \delta)}{2\delta} \quad \text{Equation 1}$$

$$\frac{\Delta f}{\Delta K} = \left[\frac{\Delta f}{\Delta K_1}, \frac{\Delta f}{\Delta K_2} \cdots \frac{\Delta f}{\Delta K_N}\right] \quad \text{Equation 2}$$

$$S_K = -\frac{\Delta f}{\Delta K} / \left\|\frac{\Delta f}{\Delta K}\right\| \quad \text{Equation 3}$$

$$h_{opt} = K + h * S_K \quad \text{Equation 4}$$

$$K_{new} = K + h_{opt} * S_K \quad \text{Equation 5}$$

In some embodiments of the present invention, the step of determining initial values for the plurality of tuning elements 210 comprises evaluating a power-conscious initial guess function, wherein the power-conscious initial guess function is derived from statistical analysis of a sample set of tuning element value variations. In an exemplary embodiment of the present invention, the step of determining initial values for the plurality of tuning elements 210 works as follows. A large sample set of multi-parameter process variations can be created using statistical sampling techniques. These can include the effects of large process shifts, inter and intra-die process variability effects. Starting from random initial guess values of the tuning element vector K, the gradient descent algorithm can be applied to find tuning element values for acceptable performance of the transceiver device. Because the initial guess for the gradient search can be random, different solutions can be obtained for different initial guess values. The solution vector K that corresponds to the lowest power consumption value can be selected as the vector corresponding to which all the tuning element values must be set for the simulated process perturbation. For each process perturbation, there can exists a corresponding set of test specification values of the transmitter and receiver. The set of specifications $S_i$ can correspond to the power optimal tuning knob vector $K_i$. Over the total set of process perturbations, a set of specifications $S_i$, $1 \leq i \leq p$, and corresponding vectors $K_i$, can be similarly created via repeated application of the gradient search. For a specific transceiver device, during the first application of AE-BIST procedure, the vector of specifications S for that transmitter or receiver can be obtained from the BIST application This vector S can be compared against all the vectors $S_i$, $1 \leq i \leq p$, and the vector $S_q$ for which $\|S-S_q\|$ is minimized can be determined The corresponding tuning element values $K_q$ can be selected to the initial guess values for that transmitter device for subsequent application of hardware-iterated gradient search.

At times, the value of the specifications can be so far outside of the predetermined operational or tolerated range that either the transceiver cannot be self-healed or doing so would require too much power. Thus, in some embodiments of the present invention, a self-healing range can indicate the range of values for the specifications for which the transceiver will self-heal. In some embodiments of the present invention, the method of power-consciously self-healing a transceiver system comprises terminating the method if the specifications are outside of a predetermined self-healing range.

Figure 1:
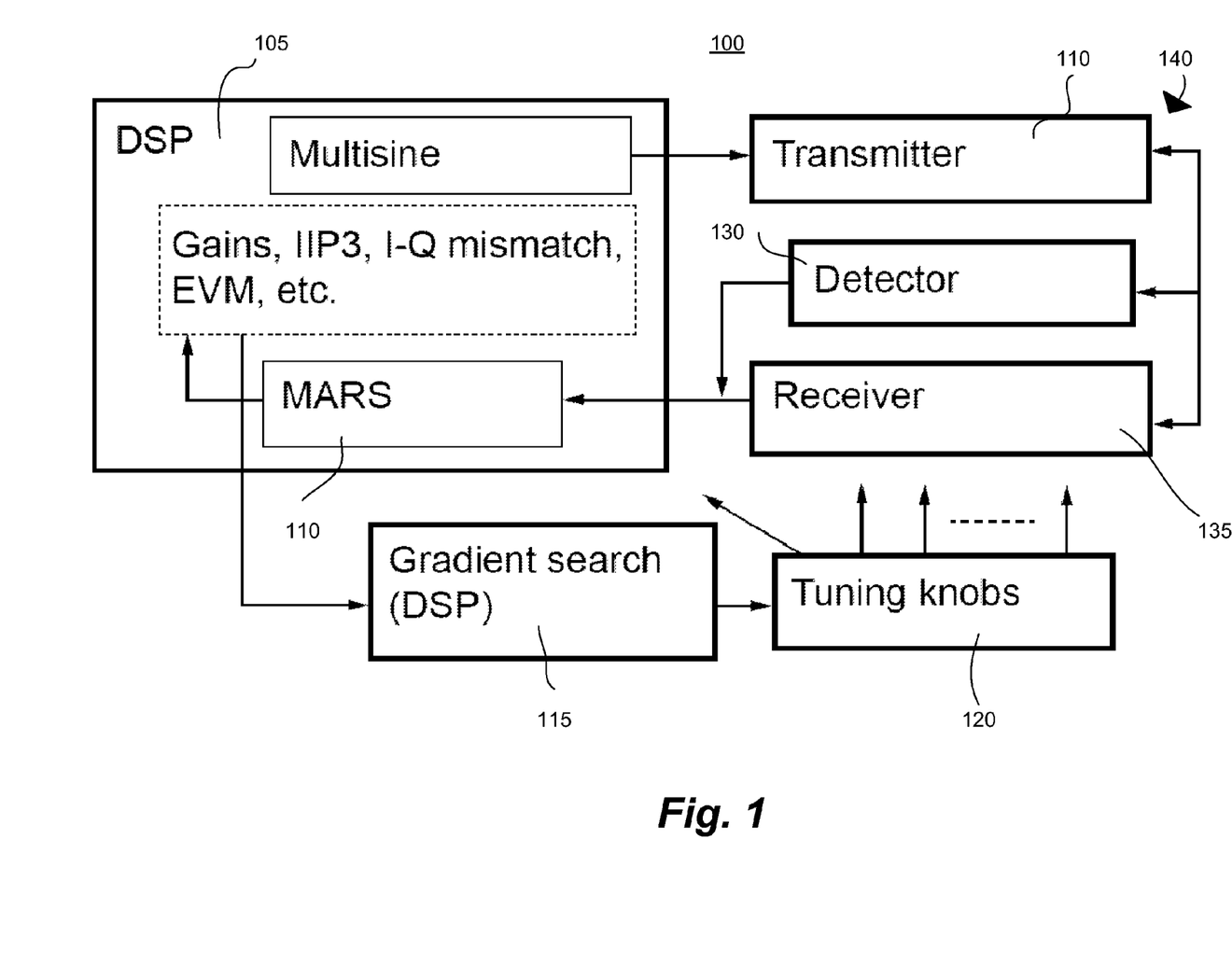
FIG. 1 provides a schematic of an power-conscious self-healing transceiver system in accordance with an exemplary embodiment of the present invention.

In addition to methods of power-consciously self-healing a transceiver system, some embodiments of the present invention relate to power-conscious self-healing transceiver systems. As shown in FIG. 1, an exemplary embodiment of the present invention provides a power-conscious self-healing transceiver system 100 comprising a transceiver device 140, a plurality of tuning elements 120, a regression analysis module 110, a DSP baseband module 105, and a gradient search module 115. The transceiver device 140 has a plurality of specifications. The plurality of specifications can include, but are not limited to, the gain, IIP2, IIP3, I-Q mismatch, EVM, and the like. The plurality of tuning elements 120 can be configured to control the plurality of specifications. In an exemplary embodiment of the present invention, the tuning elements 120 are tuning knobs which may control the plurality of specifications by altering various capacitances, resistances, voltages and/or currents within the transceiver device. The regression analysis module 110 can be configured to measure the plurality of specifications from a signal transmitted through the transceiver device 140. The DSP baseband module 105 can be configured to transmit the signal through the transceiver device 140 and configured to compute a cost function based on the measured plurality of specifications. The gradient search module 115 can be configured to determine new iteration values for the plurality of tuning elements 120 such that the plurality of specifications are within a tolerated range.

In an exemplary embodiment of the present invention, the transceiver device 140 comprises a transmitter 125, a receiver 135, and an envelope detector 130. An optimized multisine signal can applied to the transmitter 125 from the DSP baseband module 105. The signal can be upconverted in the transmitter datapath, passed through a mixer and power amplifier (not shown in FIG. 1), down-converted by the envelope detector 130, and digitized and passed back to the DSP baseband module 105. In some embodiments of the present invention, the signal is de-noised using wavelet de-noising methods (not shown in FIG. 1) and converted to the frequency domain. The regression analysis module 110 can then use a nonlinear regression function to predict the specifications of the transmitter 125 from the observed response to the applied signal. This regression mapping can be obtained via careful calibration experiments, and in some embodiments of the present invention, is based on the MARS algorithm. Specifications as complex as EVM can be predicted accurately using back-end signal processing algorithms in conjunction with MARS. Subsequently, using data from both the envelope detector 130 and the output of the receiver 135 obtained from operating the transceiver device 140 in loopback mode, the relevant specifications of the transceiver device 140 can be predicted using the regression analysis module 110.

In some embodiments of the present invention, the tuning procedure works in conjunction with the BIST as follows. The gradient search module 115 can implement the gradient search algorithm, discussed above, to determine the digital and analog tuning element values for which all the transceiver device 140 specifications are to be evaluated. The BIST procedure can be used to determine the same via the alternate test approach described earlier. From knowledge of the specification values, the cost function $f(K)$ can be computed with the DSP baseband module 105. To determine the sensitivity of the cost function to the tuning element values, $(f(K+\delta)-f(K))/2\delta$, a second BIST application for slightly perturbed valued of the tuning elements 120 ($K+\delta$) can be used. The gradient search module 115 can then generate the next set of values for the tuning elements 120 and the process can be repeated until convergence is achieved.

In some embodiments of the present invention, the MARS regression map is accurate not only across the space of process variations across which the transceiver specifications can be predicted, but it is also simultaneously accurate across all tuning element values allowable for self-tuning. Hence, the "training set" of devices used to "train" the regression function of MARS can sample the process space and the tuning element value space appropriately. In some embodiments of the present invention, the sensitivities of the specifications to the tuning element values can be used to determine how finely the same are sampled for generating the MARS "training set" of devices.

In an exemplary embodiment of the present invention, the transmitter 125 and receiver 135 are tuned concurrently. In another exemplary embodiment, the transmitter 125 is tuned first, and the receiver 135 is tuned second. In some embodiments of the present invention, turning the transmitter 125 before the receiver 135 uses fewer tuning iterations than when the transmitter 125 and receiver 135 are tuned concurrently.

In another exemplary embodiment of the present invention, the AE-BIST approach uses three steps. In the first step, I-Q mismatch is determined using a specialized test waveform. In the second step, static transceiver device nonidealities, such as gain, IIP3, and IIP2, are determined. In the third step, dynamic noise-dependent specification, such as ACPR and EVM are estimated.

In some embodiments of the present invention, the cost function of the gradient search routine can be implemented as a weighted sum of the performance metrics along with their guard bands ("Gb"). In Equation 6, $S_i^j$ denotes the $i^{th}$ specification of the $j^{th}$ tuning element setting, Snom denotes the nominal specification value, and W denotes the weight assignments for individual performance metrics. By assigning appropriate weights, the proposed cost can be manipulated to achieve different trade-offs between multiple performance metrics for overall yield improvement.

$$\sum_{i=1}^{K} W_i * \left(1 - \frac{S_i^j}{Snom_i - Gb_i}\right) * \left(1 - \frac{S_i^j}{Snom_i + Gb_i}\right) \quad \text{Equation 6}$$

Figure 9:
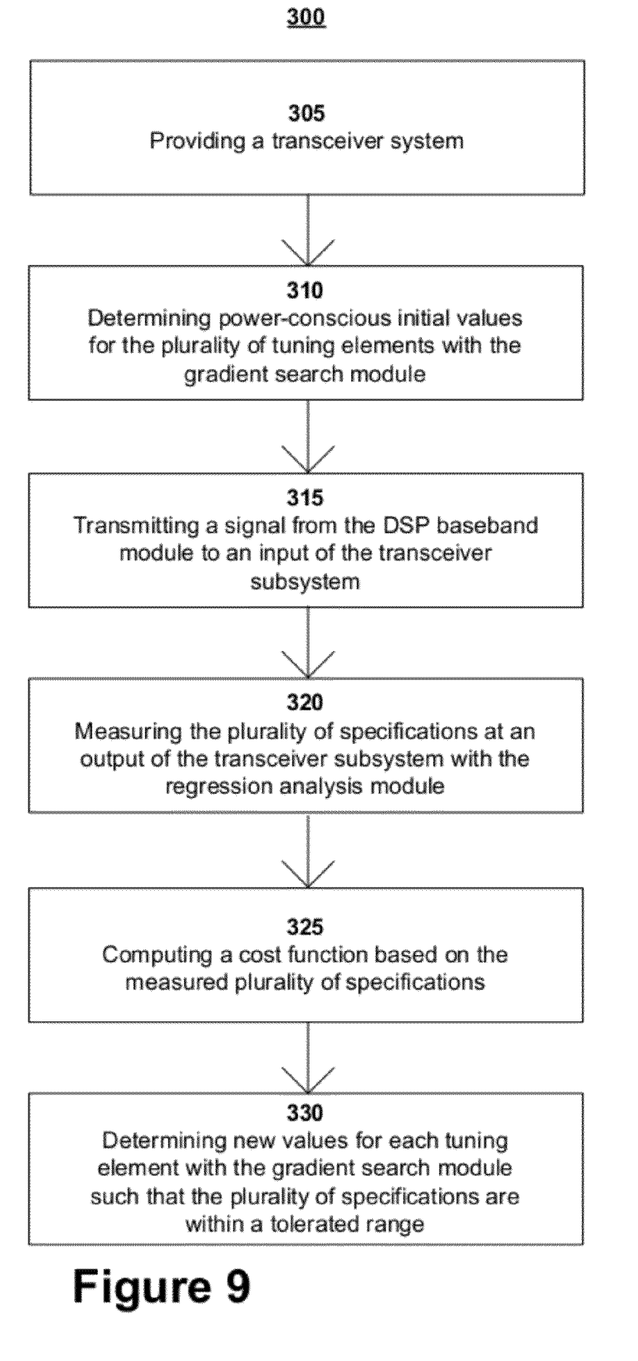
FIG. 9 provides a block diagram of another method of power-consciously self-healing a transceiver system, in accordance with an exemplary embodiment of the present invention.

As illustrated in FIG. 9, yet another exemplary embodiment of the present invention provides a method of power consciously self-healing a transceiver system 300. The method comprises providing a transceiver system 305 having a transceiver device with a plurality of specifications, a plurality of tuning elements configured to control the plurality of specifications, a DSP baseband module, a gradient search module, and a regression analysis module. The method 300 further comprises determining power-conscious initial values for the plurality of tuning elements with the gradient search module 310, transmitting a signal from the DSP baseband module to an input of the transceiver subsystem 315, measuring the plurality of specifications at an output of the transceiver subsystem with the regression analysis module 320, computing a cost function based on the measured plurality of specifications 325, and determining new values for each tuning element with the gradient search module such that the plurality of specifications are within a tolerated range 330. In some embodiments of the present invention, the step of determining initial values for the plurality of tuning elements 310 comprises evaluating an initial guess function, wherein the initial guess function is derived from statistical analysis of a sample set of tuning element value variations.

RF Device and System Modeling

An exemplary embodiment of a self-healing method of the present invention has been demonstrated on a behavioral model of a 2.4 GHz OFDM RF transceiver. Both static and dynamic nonlinearities are modeled at the behavioral level. I-Q mismatch effects and DC offset effects are also modeled. The modeling aspects of each block are described briefly below.

Modeling Static Non-Linearities

Amplifiers: The amplifiers of the RF transceiver (e.g. LNA) were realized by implementing a non-linear transfer function of the type $y(t)=\alpha_0+\alpha a_1 x(t)+\alpha_2 x^2(t)+\alpha_3 x^3(t)$, where $\alpha_0$ is the amplifier offset, $\alpha_1$ is the small signal gain, $\alpha_2$ and $\alpha_3$ are nonlinear coefficients used to realize the linear (gain) and nonlinear (harmonics and inter-modulation terms) effects of the amplifier.

Mixers: The mixer of the RF transceiver was modeled as a nonlinear transfer function followed by an ideal multiplier. The frequency mixing operation was realized by the multiplication operation $y(t)=Cx_1(t)x_2(t)$.

Figure 2:
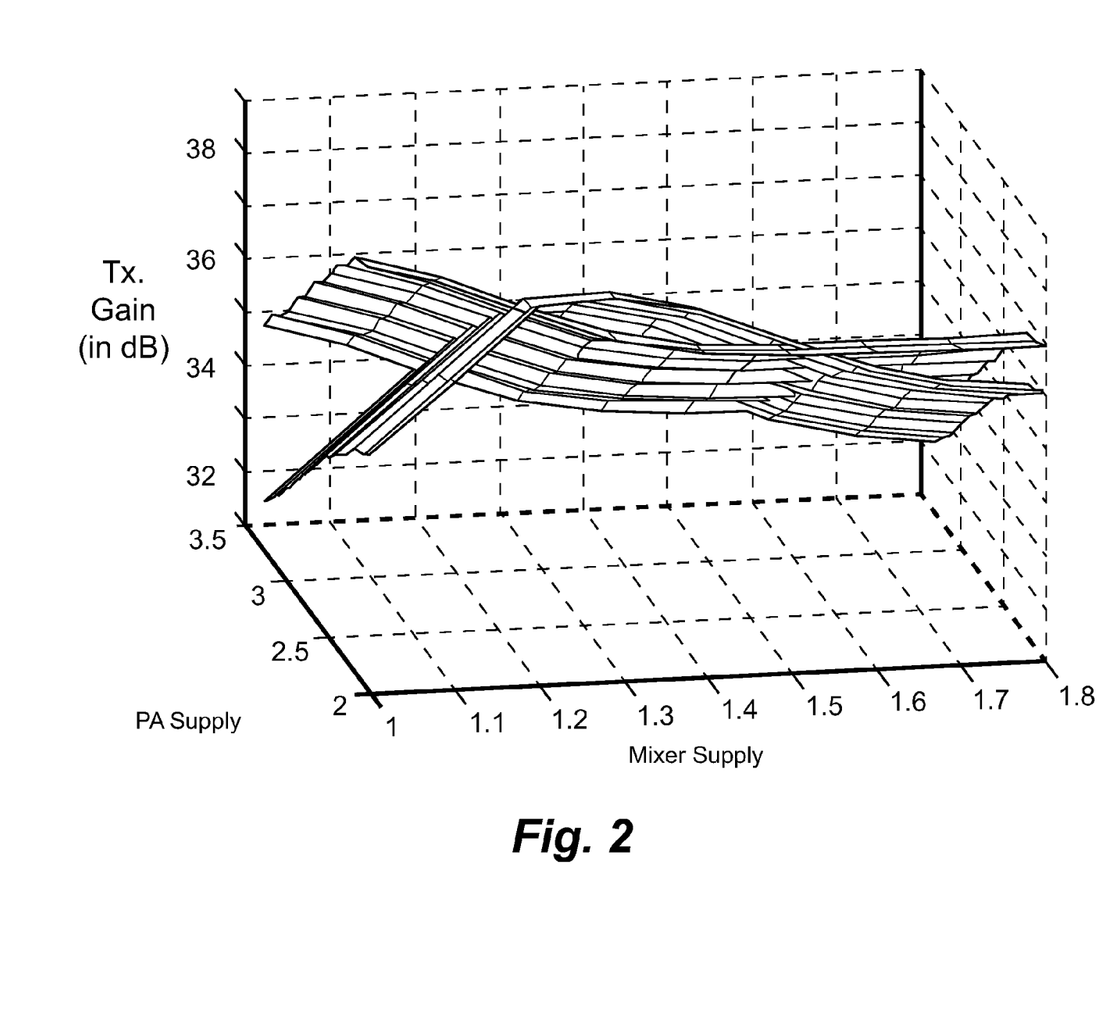
FIG. 2 provides transmitter gain variation with tuning elements obtained from circuit level ADS simulations in accordance with an exemplary embodiment of the present invention.

The $V_{in}$ versus $V_{out}$ curves for the circuit level designs of mixers, PA, and LNA were obtained using Agilent-ADS simulations across the selected range of process perturbations (generated by Monte-Carlo simulations for active and passive devices) and tuning element values (bias currents and supply voltages). The behavioral models for the amplifiers and mixers were then fitted to the observed ADS simulation data for accurate behavioral level simulation (without such simulation repeated BIST application for tuning is difficult to simulate). The static non-idealities were then extracted from the models obtained using standard formulae where applicable or extracted via simulation. The transmitter gain variation with tuning elements (PA and mixer supply) for two such process instances obtained from circuit level ADS simulations are shown in FIG. 2.

Modeling Mismatch Effects

Mismatch effects in the quadrature modulator and demodulator result in the increase of the Bit Error Rate ("BER") of the system and restrict the tuning capability of the system. Using an exemplary embodiment of the present invention, phase mismatch and DC offset of the modulator and the demodulator were modeled, estimated, and compensated. I/Q amplitude mismatch ($\epsilon$), phase mismatch ($\theta$), and DC offset ($\zeta$), are used in Equation 7, which describes how I-Q mismatch was modeled.

$$R(t)=I^*(\cos(\omega_c t)+Q^*(1+\epsilon)\sin(\omega_c t+\theta))+\zeta \qquad \text{Equation 7}$$

In Equation 7, R(t) is the up-converted signal, $\omega_c$ is the carrier frequency, and I and Q in the In-phase and Quadrature path baseband signals, respectively. A similar equation can be used to model the demodulator.

Modeling Dynamic Non-Linearity

Figure 3:
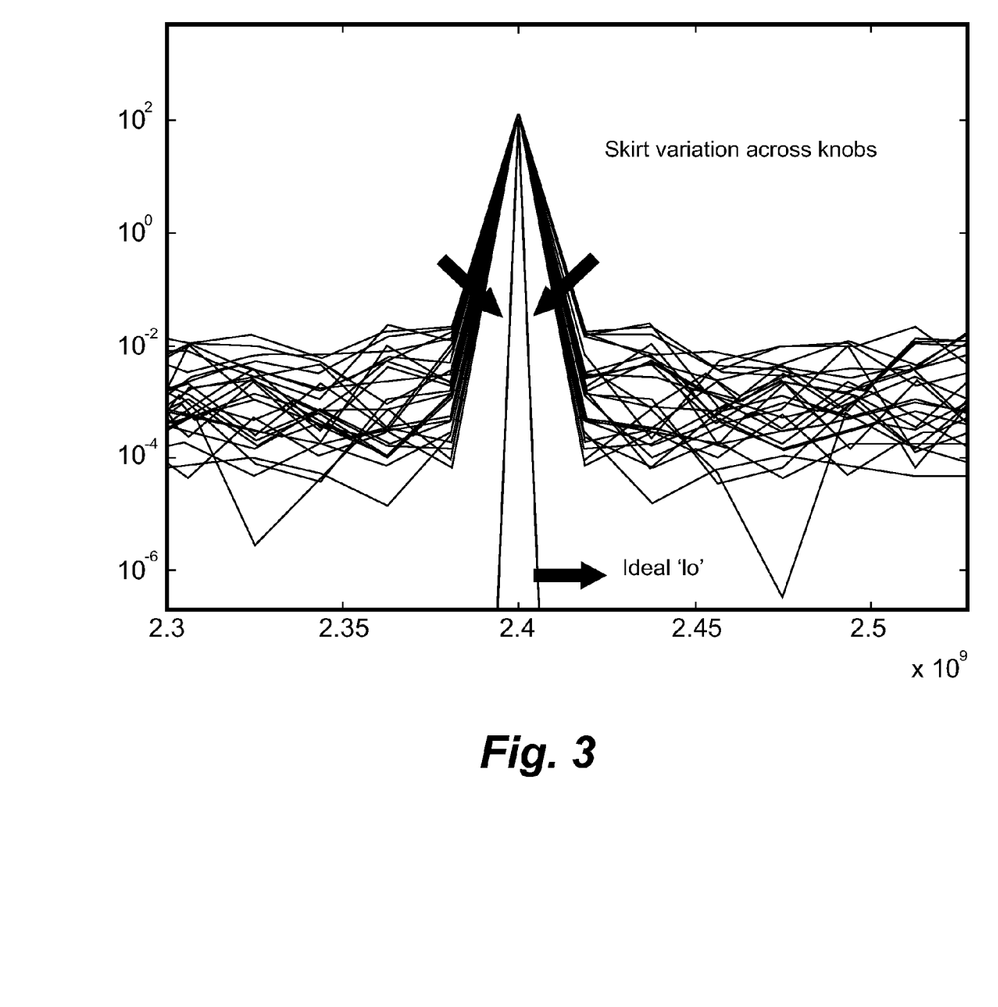
FIG. 3 illustrates the impact of phase noise on the local oscillator signal spectrum in accordance with an exemplary embodiment of the present invention.

The phase noise of the system can be modeled based on the dBc/Hz requirements at specific frequency offsets for an LC oscillator. The phase noise of the local oscillator is tuned by varying the supply voltage and the varactors of the LC oscillator in a correlated manner. This can result in a different dBc/Hz value at a specific frequency offset. FIG. 3 illustrates the impact of phase noise on the local oscillator signal spectrum.

Simulation Results

Figure 4:
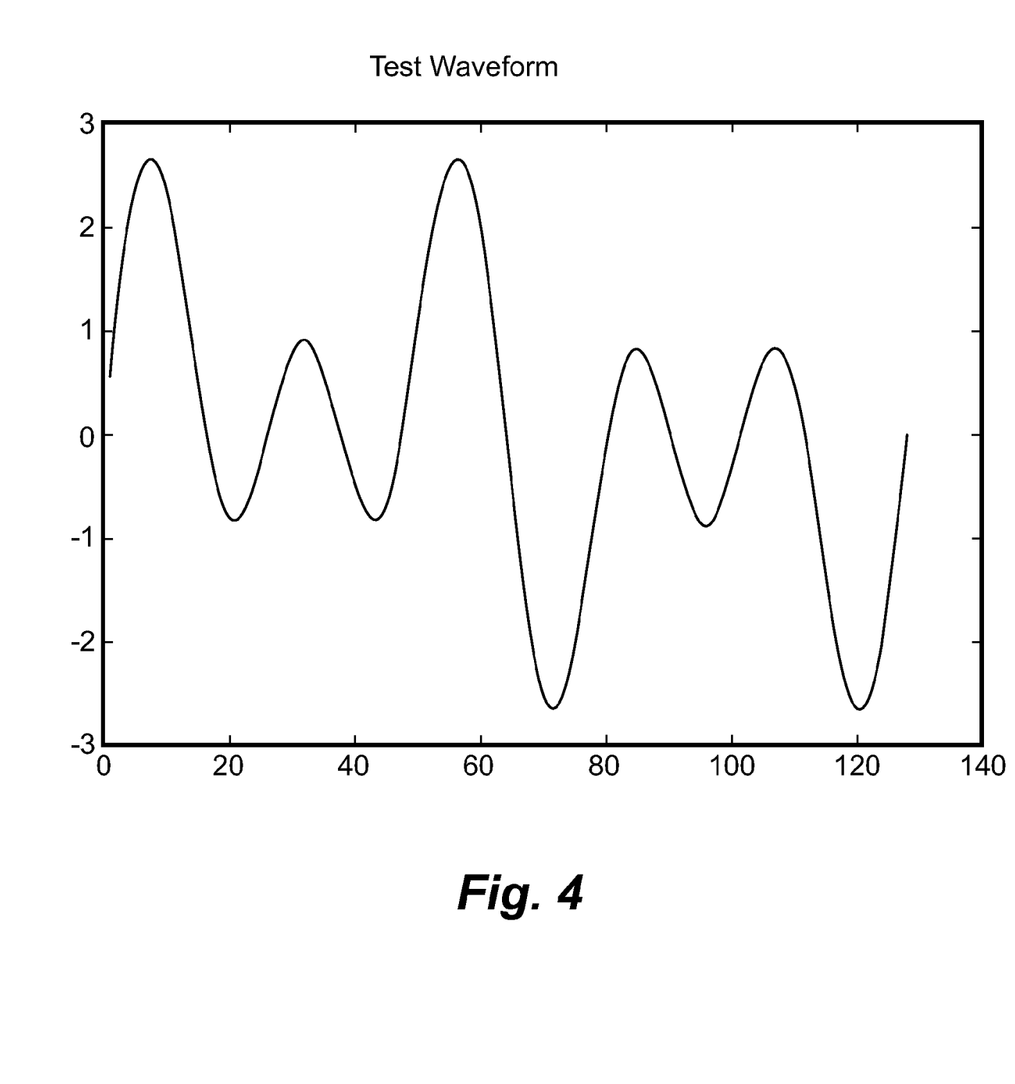
FIG. 4 provides a waveform of a stimulus input signal in accordance with an exemplary embodiment of the present invention.
Figure 5:
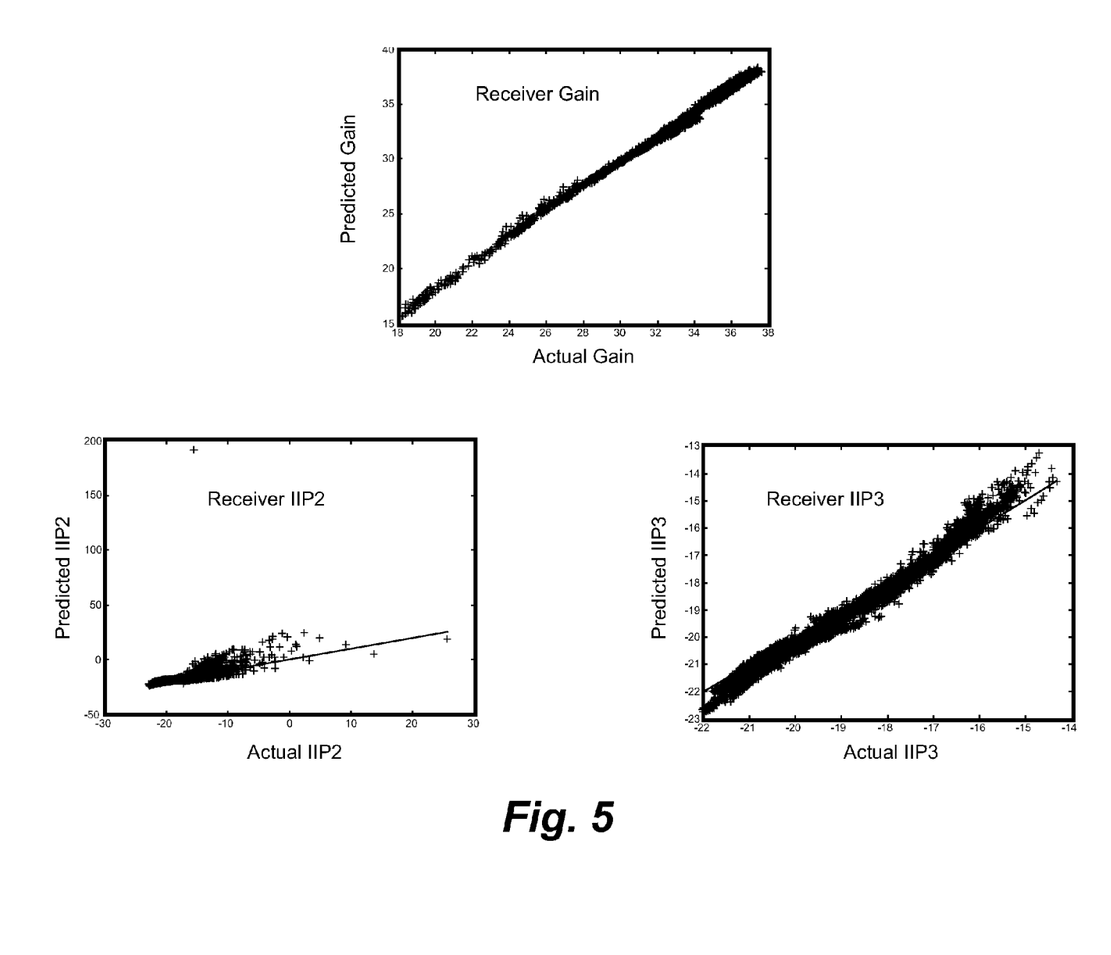
FIG. 5 provides a graphical illustration of predicted versus measured specifications of a transceiver in accordance with an exemplary embodiment of the present invention.

Experimental results obtained from simulations of a 2.4 GHz RF transceiver using an exemplary embodiment of the present invention are now presented. I-Q mismatch was determined and was compensated digitally in the baseband. The input stimulus shown in FIG. 4 was used as the test input for determining the transceiver static nonidealities. FIG. 5 illustrates the predicted versus measured receiver specifications from application of the multisine, shown in FIG. 4, in loop-back mode through the transmitter. After tuning of the static specifications is completed, VCO phase noise was tuned using fast EVM tests using back-end signal processing algorithms.

Transmitter Initial Guess Tuning

The tuning ranges of the tuning elements were selected to allow only acceptable degradation of the NF through the tuning process. The estimated static nonlinearities from the static BIST routines explained above was fit into the cost function formulation shown in Equation 6. The gradient search module was then used to determine the optimal tuning element values for yield improvement. Table 1 provides the nominal specifications and acceptable values for a nominal 2.4 GHz RF transmitter. Table 2 provides the specification values of a process instance 'P1' of the transmitter before tuning. Table 2 also provides the specification values obtained after application of an intelligent initial guess algorithm, in accordance with an exemplary embodiment of the present invention, for the same process instance 'P1.' Table 3 provides the specification values obtained after performing a gradient search based iterative procedure to determine the best tuning element values, in accordance with an exemplary embodiment of the present invention.

TABLE 1

Nominal Specifications for the Transmitter

|  | Gain | IIP2 | IIP3 |
|---|---|---|---|
| Nominal | 36 dB | −4 dBm | −5 dBm |
| Lower Bound | 34 dB | −6 dBm | −7 dBm |
| Upper Bound | 38 dB | −2 dBm | −3 dBm |

TABLE 2

Specifications of P1 before Tuning

|  | Gain | IIP2 | IIP3 |
|---|---|---|---|
| Before Initial Guess | 40.9 dB | −7 dBm | −9.5 dBm |
| After Initial Guess | 38.5 dB | −5.9 dBm | −7.5 dBm |

TABLE 3

Specifications of P1 after Power Initialized Gradient Search

|  | Gain | IIP2 | IIP3 | Power |
|---|---|---|---|---|
| After Tuning | 37.7 dB | −4.0 dBm | −6.5 dBm | 105.2 mW |

Receiver Initial Guess and Tuning

The receiver nonlinearity was tuned in a similar fashion to the transmitter. Table 4 provides the nominal specifications of a nominal 2.4 GHz RF receiver. Table 5 provides the specification values of a process instance 'P2' before tuning. Table 5 also provides the specification values obtained after performing an intelligent initial guess of the same instance 'P2,' in accordance with an exemplary embodiment of the present invention. Table 6 provides the specification values obtained after performing the gradient search to obtain the best tuning element values, in accordance with an exemplary embodiment of the present invention.

TABLE 4

Nominal Specifications for the Receiver

|  | Gain | IIP2 | IIP3 |
|---|---|---|---|
| Nominal | 29 dB | −12 dBm | −16 dBm |
| Lower Bound | 27 dB | −14 dBm | −18 dBm |
| Upper Bound | 31 dB | −10 dBm | −14 dBm |

TABLE 5

Specifications of P2 before Tuning

|  | Gain | IIP2 | IIP3 |
|---|---|---|---|
| Before Initial Guess | 36.45 dB | −18 dBm | −20.8 dBm |
| After Initial Guess | 31.5 dB | −13.8 dBm | −17.6 dBm |

TABLE 6

Specifications of P2 after Power Initialized Gradient Search

|  | Gain | IIP2 | IIP3 | Power |
|---|---|---|---|---|
| After Tuning | 27.86 dB | −12.204 dBm | −15.85 dBm | 16.95 mW |

Impact on Power

One major advantage of some embodiments of the present invention over the prior art is the ability to perform rapid, power-conscious self-healing of RF front ends. Therefore, to illustrate the advantages, self-healing methods were performed with and without power-consciousness for the transmitter instance 'P1' and the receiver instance 'P2.' Table 7 provides the comparison results between the self-healing methodologies with and without power consciousness tradeoffs for a 2.4 GHz RF transmitter. Table 8 provides the comparison results for the receiver instance 'P2.' From Tables 7 and 8, it is clear that the power initialized gradient search technique converges to a significantly lower power consumption value without compromising the yield of the system.

TABLE 7

Comparison Results for Transmitter Instance P1

| | Gain | IIP2 | IIP3 | Power |
|---|---|---|---|---|
| With Power-Consciousness | 37.7 dB | −4.0 dBm | −6.5 dBm | 105.28 mW |
| Without Power-Consciousness | 37.6 dB | −3.9 dBm | −6.2 dBm | 171.5 mW |

TABLE 8

Comparison Results for Receiver Instance P2

| | Gain | IIP2 | IIP3 | Power |
|---|---|---|---|---|
| With Power-Consciousness | 27.86 dB | −12.2 dBm | −15.85 dBm | 16.95 mW |
| Without Power-Consciousness | 27.06 dB | −13.6 dBm | −17.09 dBm | 47.65 mW |

Yield Analysis

Figure 6:
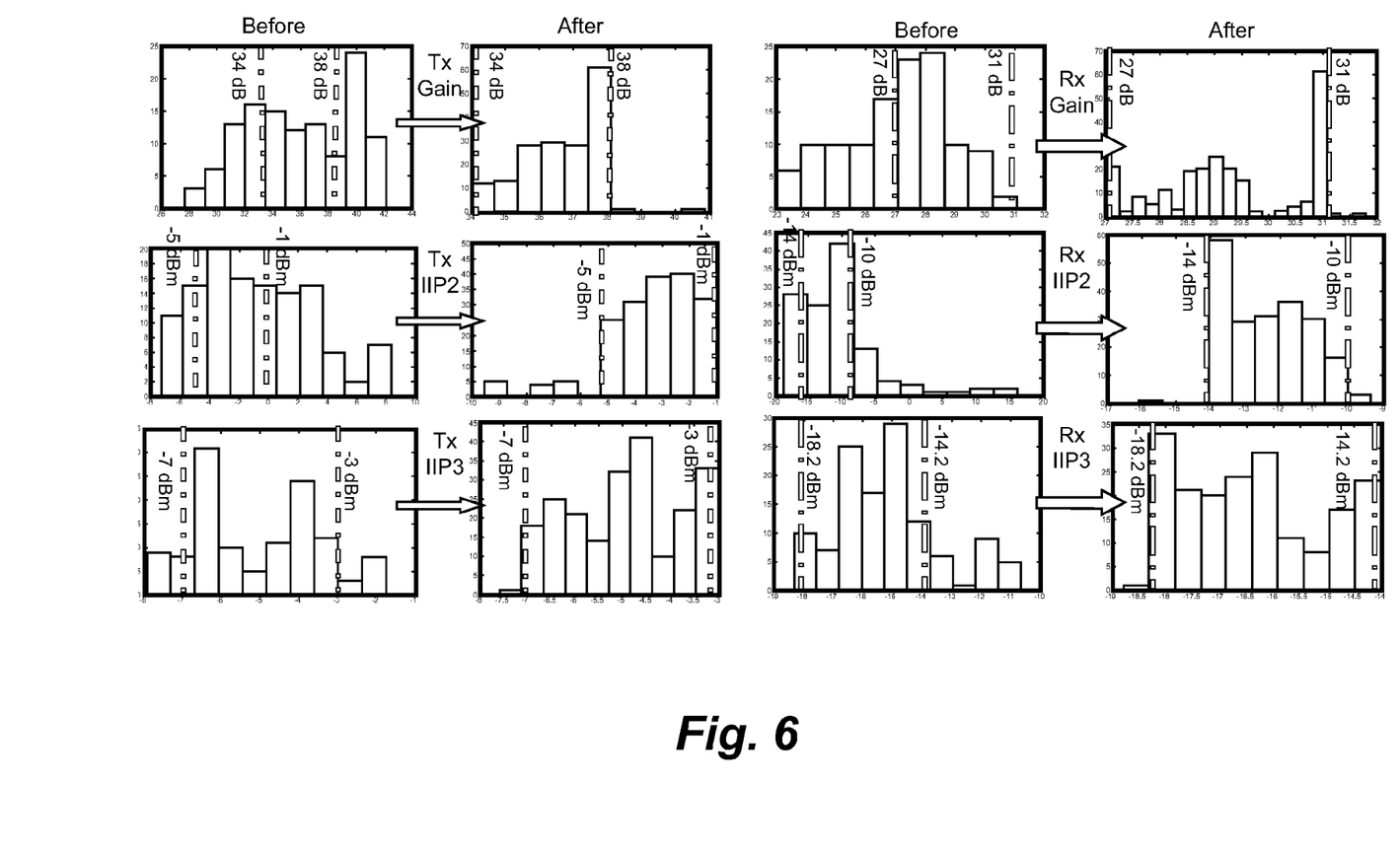
FIG. 6 provides yield histograms before and after tuning for a transmitter and receiver in accordance with an exemplary embodiment of the present invention.

A gradient search procedure, in accordance with an exemplary embodiment of the present invention, was used to compensate for process variability to result in yield enhancement with minimal impact in the power consumption values. A set of 200 instances were used to create a process lot for the transmitter and the receiver. On an average, the optimization engine converged in three to four iterations for each process instance. The yield analysis of the lot before and after a self-healing method of the present invention is presented. Gain, IIP2, and IIP3 were used for the yield calculation. The bounds for gain, IIP2, and IIP3 were fixed according to Tables 1 and 4. FIG. 6 shows the yield plots before and after tuning for the transmitter and the receiver. Based on the given bounds, the yield was observed to be 63.46% before tuning and 96.69% after tuning for the transmitter process lot. Thus, employing an exemplary self-healing method of the present invention resulted in a yield improvement of 33.23%. Based on the given bounds, the yield was observed to be 61.2% before tuning and 95.04% after tuning for the receiver process lot. Thus, employing an exemplary self-healing method of the present invention resulted in a yield improvement of 33.84%. Therefore, exemplary embodiments of the present invention may be used to improve transceiver yield by at least 30%.

Experimental Results: Hardware Study

The results pertaining to hardware experiments using an exemplary embodiment of the present invention are now provided.

Hardware Setup

Figure 7:
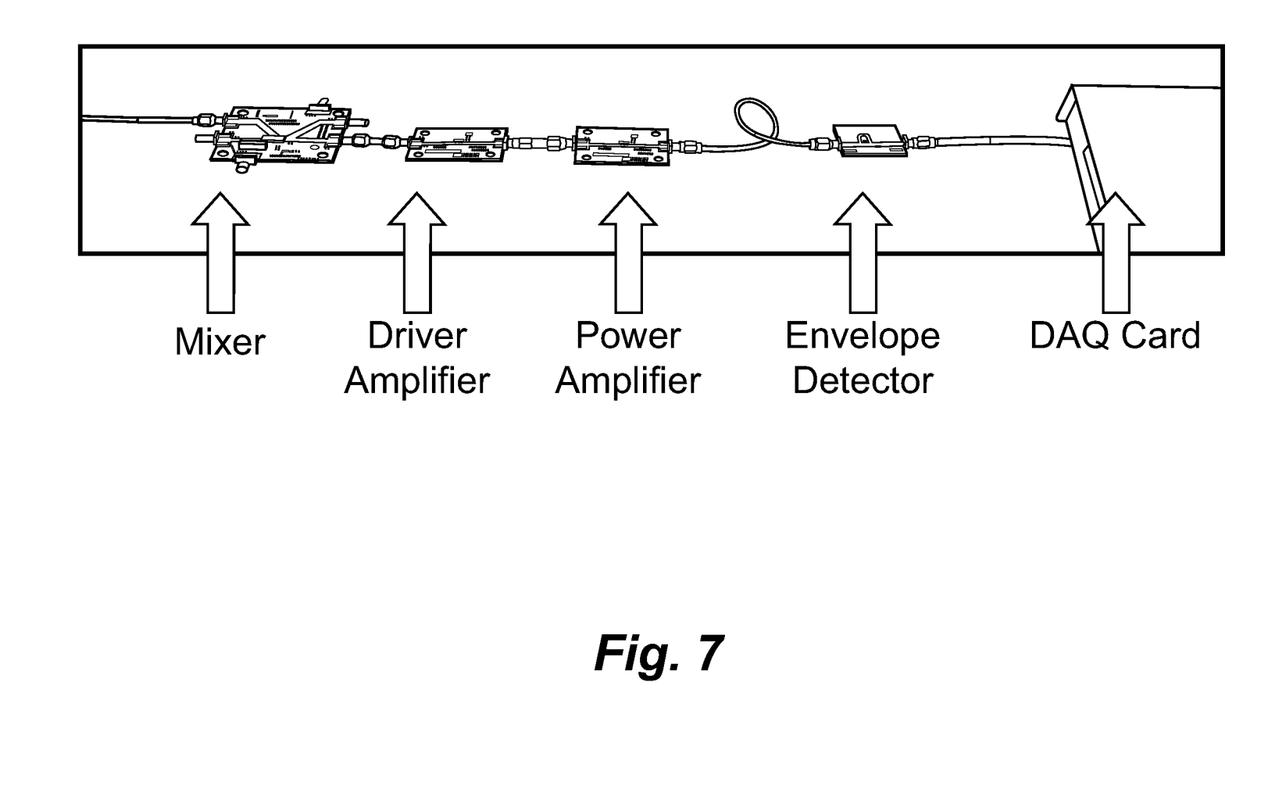
FIG. 7 depicts an experimental hardware setup in accordance with an exemplary embodiment of the present invention.

An off-the-shelf transmitter chain was constructed to perform hardware experiments. The chain was built using an ADL8349 I-Q modulator followed by an ADL5320 Driver Amplifier feeding off to another ADS5320 Driver Amplifier. The supply voltages of the circuits were controlled using two precision Keithley 2400 DC power supply sources and an HP Agilent E3631A with GP1B control from the PC. The frequency of operation of the hardware setup was 1.9 GHz. Process variation was induced by replacing a capacitor in the input matching circuit of the driver amplifier with a supply voltage values across the varactor. The experimental setup is depicted in FIG. 7. During each step of the iteration, alternate tests were invoked and the corresponding response was captured using an envelope detector. The gradient algorithm for tuning the transmitter was run in the software, and the interface to the hardware and the software was provided by a PCI 6115 data acquisition card.

Results

In the experimental tests, gain and IIP3 were considered for hardware verification. Table 9 provides the nominal specification values of the transmitter chain. Table 10 provides the specification values of a process instance before tuning. Table 11 provides the specification values for the same instance after tuning. Table 11 also provides the results of tuning the transmitter with and without power consciousness. In the experimental test, only two iterations were taken to converge to the optimal tuning element values. It can be observed that the tuning of the transmitter without power consciousness converged to a significantly higher power consumption value than with power consciousness.

TABLE 9

Nominal Specifications of the Transmitter Chain

| | Gain | IIP3 |
|---|---|---|
| Nominal | 3.5 dB | 10.5 dBm |
| Upper Bound | 4.5 dB | 11.5 dBm |
| Lower Bound | 2.5 dB | 9.5 dBm |

TABLE 10

Specifications of Instance 'N1' Before Tuning

| | Gain | IIP3 |
|---|---|---|
| Before Tuning | 6 dB | 8 dBm |

TABLE 11

Specifications of Instance 'N1' After Tuning

| | Gain | IIP2 | Power |
|---|---|---|---|
| With Power-Consciousness | 3.965 dB | 10.229 dBm | 1.402 W |
| Without Power-Consciousness | 4.45 dB | 10.04 dBm | 1.652 W |

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A power-conscious self-healing transceiver system, comprising:
   a transceiver device having a plurality of specifications;
   a plurality of tuning elements configured to control the plurality of specifications;
   a regression analysis module configured to measure the plurality of specifications from a signal transmitted through the transceiver device;
   a digital signal processing ("DSP") baseband module configured to transmit the signal through the transceiver device and configured to compute a cost function based on the measured plurality of specifications; and
   a gradient search module configured to determine new iteration values for the plurality of tuning elements such that the plurality of specifications are within a tolerated range.

2. The power-conscious self-healing transceiver system of claim 1, wherein the regression analysis module employs architecture to implement a MARS algorithm.

3. The power-conscious self-healing transceiver system of claim 1, wherein the transceiver device comprises:
   a transmitter configured to receive the signal from the DSP baseband module and up-convert the signal;
   a receiver configured to receive the signal from the transmitter; and
   an envelope detector configured to receive the signal from the transmitter and down-convert the signal,
   wherein the regression analysis module receives the signal from the receiver and the envelope detector.

4. The power-conscious self-healing transceiver system of claim 1, wherein the gradient search module is configured to determine new iteration values for the plurality of tuning elements based on the measured plurality of specifications resulting from previous iteration values for the plurality of tuning elements.

5. The power-conscious self-healing transceiver system of claim 1, wherein the gradient search module is further configured to determine power-conscious initial iteration values for the plurality of tuning elements.

6. The power-conscious self-healing transceiver system of claim 5, wherein the power-conscious initial iteration values are determined from an initial guess function, wherein the initial guess function is derived from statistical analysis of a sample set of tuning element value variations.

7. The power-conscious self-healing transceiver system of claim 1, wherein the transceiver device is a radio-frequency transceiver device.

8. A method of power-consciously self-healing a transceiver system, the method comprising:
   providing a transceiver system comprising:
      a transceiver device having a plurality of specifications;
      a plurality of tuning elements configured to control the plurality of specifications;
      a digital signal processing ("DSP") baseband module;
      a gradient search module; and
      a regression analysis module;
   determining power-conscious initial values for the plurality of tuning elements with the gradient search module;
   transmitting a signal from the DSP baseband module to an input of the transceiver device;
   measuring the plurality of specifications at an output of the transceiver device with the regression analysis module;
   computing a cost function based on the measured plurality of specifications;
   determining new values for each tuning element with the gradient search module such that the plurality of specifications are within a tolerated range.

9. The method of power-consciously self-healing a transceiver system of claim 8, wherein the step of determining initial values for the plurality of tuning element comprises evaluating an initial guess function, wherein the initial guess function is derived from statistical analysis of a sample set of tuning element value variations.

10. The method of power-consciously self-healing a transceiver system of claim 8, wherein the transceiver device is a radio-frequency transceiver device.

* * * * *